United States Patent
Schaffert (10) Patent No.: US 12,030,465 B2
(45) Date of Patent: Jul. 9, 2024

(54) WHEEL SCRAPER FOR AGRICULTURAL PLANTER

(71) Applicant: SCHAFFERT MANUFACTURING COMPANY, INC., Indianola, NE (US)

(72) Inventor: Kris Schaffert, Indianola, NE (US)

( * ) Notice: Subject to any disclaimer, the term of this patent is extended or adjusted under 35 U.S.C. 154(b) by 537 days.

(21) Appl. No.: 17/327,009

(22) Filed: May 21, 2021

(65) Prior Publication Data
US 2022/0371555 A1    Nov. 24, 2022

(51) Int. Cl.
*B60S 1/68*    (2006.01)
*A01B 76/00*   (2006.01)
*A01C 5/06*    (2006.01)

(52) U.S. Cl.
CPC ............... *B60S 1/68* (2013.01); *A01B 76/00* (2013.01); *A01C 5/068* (2013.01)

(58) Field of Classification Search
CPC ............ B60S 1/68; A01B 76/00; A01C 5/068
See application file for complete search history.

(56) References Cited

U.S. PATENT DOCUMENTS

| | | | |
|---|---|---|---|
| 13,683 A | 10/1855 | Mccormick | |
| 35,510 A | 6/1862 | De Haven | |
| 122,299 A | 12/1871 | Wight et al. | |
| 176,708 A | 4/1876 | Templin | |
| 185,660 A * | 12/1876 | Bacon | B60S 1/68 15/246 |
| 203,207 A | 4/1878 | Springer | |
| 211,601 A | 1/1879 | Springer | |
| 246,296 A * | 8/1881 | Dean | B60S 1/68 280/855 |
| 252,265 A | 1/1882 | Scofield | |
| 288,661 A | 11/1883 | Purdy et al. | |
| 308,327 A | 11/1884 | Runstetler | |
| 322,841 A | 7/1885 | Miskimen | |
| 330,169 A * | 11/1885 | Thoman | B60S 1/68 280/855 |

(Continued)

FOREIGN PATENT DOCUMENTS

| | | | |
|---|---|---|---|
| DE | 3321490 A1 | 12/1984 | |
| DE | 3441610 A1 | 5/1986 | |
| GB | 2455164 A * | 6/2009 | ............... B08B 1/00 |

OTHER PUBLICATIONS

Author Unknown , "1200 Series Advanced Seed Meter Planters", Case lil, 2005, 1-35.

(Continued)

*Primary Examiner* — Jacob B Meyer
(74) *Attorney, Agent, or Firm* — Dorsey & Whitney LLP (57) ABSTRACT

A wheel scraper for an agricultural planter includes a body defining a mounting portion, a biasing portion extending from the mounting portion, and a tine portion extending from the biasing portion opposite the mounting portion. The mounting portion is configured to couple the wheel scraper to an agricultural planter relative to a wheel on the agricultural planter such that the tine portion is arranged extending adjacent to an outer circumferential surface of the wheel and separated from the outer circumferential surface by a clearance. The biasing portion is configured to resiliently bias the tine portion relative to the outer circumferential surface.

20 Claims, 4 Drawing Sheets

(56) References Cited

U.S. PATENT DOCUMENTS

| | | | |
|---|---|---|---|
| 388,378 A * | 8/1888 | Sparrow | B60S 1/68 280/855 |
| 555,897 A | 3/1896 | Crane | |
| 601,623 A * | 4/1898 | Ash | B60S 1/68 280/855 |
| 612,819 A * | 10/1898 | Brusseau | B60S 1/68 280/855 |
| 705,123 A * | 7/1902 | Oastler | B60S 1/68 280/855 |
| 787,016 A * | 4/1905 | Wimer | A01B 15/06 172/558 |
| 889,947 A | 6/1908 | Miller | |
| 909,137 A | 1/1909 | Bellerive | |
| 1,259,865 A * | 3/1918 | Hill | B60S 1/68 280/855 |
| 1,473,297 A | 11/1923 | Knight | |
| 1,493,397 A * | 5/1924 | Slavick | B60S 1/68 280/855 |
| 1,699,577 A * | 1/1929 | Yetter | B60S 1/68 280/855 |
| 1,743,530 A * | 1/1930 | Chapman | B60S 1/68 280/855 |
| 1,761,262 A * | 6/1930 | Guth | B60S 1/68 280/855 |
| 1,774,463 A * | 8/1930 | Webber | B60S 1/68 16/41 |
| 1,782,085 A * | 11/1930 | Zerwig | B60S 1/68 280/855 |
| 1,815,991 A * | 7/1931 | Sealey | B60S 1/68 280/856 |
| 1,877,005 A * | 9/1932 | Merklin | B60S 1/68 15/246 |
| 1,924,626 A * | 8/1933 | Roddel | B60S 1/68 280/855 |
| 1,933,679 A * | 11/1933 | Nicewander | B60S 1/68 404/129 |
| 2,082,141 A * | 6/1937 | Beran | B60S 1/68 280/855 |
| 2,242,608 A * | 5/1941 | Graves | B60S 1/68 280/856 |
| 2,533,374 A | 12/1950 | Hyland | |
| 2,571,285 A * | 10/1951 | Oehler | A01C 5/068 280/856 |
| 2,667,362 A * | 1/1954 | Woodward | A01C 5/068 280/856 |
| 2,805,486 A | 9/1957 | Barrett | |
| 2,849,969 A | 9/1958 | Taylor | |
| 2,872,883 A | 2/1959 | Padrick | |
| 2,949,722 A | 8/1960 | Henry et al. | |
| 3,115,192 A | 12/1963 | Bushmeyer | |
| 3,177,830 A | 4/1965 | Zimmerman | |
| 3,336,885 A | 8/1967 | Lebow | |
| 3,599,729 A | 8/1971 | Greemore | |
| 3,666,572 A | 5/1972 | Nakagawa et al. | |
| 3,895,589 A | 7/1975 | Garner et al. | |
| 4,108,089 A | 8/1978 | van der Lely | |
| 4,148,267 A | 4/1979 | Bennett et al. | |
| 4,253,412 A | 3/1981 | Hogenson | |
| 4,276,836 A | 7/1981 | Pust | |
| 4,294,181 A | 10/1981 | Smith | |
| 4,373,455 A | 2/1983 | Friggstad | |
| 4,398,478 A | 8/1983 | Frase et al. | |
| 4,542,705 A | 9/1985 | Orth | |
| 4,565,141 A | 1/1986 | Kopecky | |
| 4,580,507 A | 4/1986 | Dreyer et al. | |
| 4,605,239 A * | 8/1986 | Warfel | B60S 1/68 15/160 |
| 4,607,581 A | 8/1986 | Kopecky | |
| 4,628,841 A | 12/1986 | Powilleit | |
| 4,671,193 A | 6/1987 | States | |
| 4,674,419 A | 6/1987 | Kopecky | |
| 4,819,737 A | 4/1989 | Frase | |
| 4,911,090 A | 3/1990 | Schimke | |
| 5,078,528 A | 1/1992 | Schmidt | |
| 5,092,255 A | 3/1992 | Long et al. | |
| 5,269,380 A * | 12/1993 | Lofquist | A01C 5/064 172/558 |
| 5,297,497 A * | 3/1994 | Schmidt | B60S 1/68 111/135 |
| 5,361,848 A | 11/1994 | Fleischer et al. | |
| 5,375,542 A | 12/1994 | Schaffert | |
| 5,398,771 A | 3/1995 | Hornung et al. | |
| 5,425,318 A | 6/1995 | Keeton | |
| 5,640,915 A | 6/1997 | Schaffert | |
| 5,673,638 A | 10/1997 | Keeton | |
| 5,730,074 A | 3/1998 | Peter | |
| 5,852,982 A | 12/1998 | Peter | |
| 5,884,711 A * | 3/1999 | Shoup | A01B 71/08 172/558 |
| 5,904,107 A | 5/1999 | Kester | |
| 5,918,557 A | 7/1999 | Schaffert | |
| 5,996,514 A | 12/1999 | Arriola et al. | |
| 6,082,274 A | 7/2000 | Peter | |
| 6,082,275 A | 7/2000 | Schaffert | |
| 6,119,608 A | 9/2000 | Peterson et al. | |
| 6,148,747 A | 11/2000 | Deckler et al. | |
| D440,985 S | 4/2001 | Noonan et al. | |
| 6,209,466 B1 | 4/2001 | Wodrich | |
| 6,220,191 B1 | 4/2001 | Peter | |
| 6,283,050 B1 | 9/2001 | Schaffert | |
| 6,321,667 B1 | 11/2001 | Shoup | |
| 6,453,832 B1 | 9/2002 | Schaffert | |
| 6,530,334 B2 | 3/2003 | Hagny | |
| 6,640,732 B2 | 11/2003 | Prairie et al. | |
| 6,763,773 B2 | 7/2004 | Schaffert | |
| 7,121,216 B2 | 10/2006 | Schaffert | |
| 7,131,216 B2 * | 11/2006 | Nepil | G01B 3/12 33/772 |
| 7,360,495 B1 | 4/2008 | Martin | |
| 7,410,005 B2 | 8/2008 | Lung et al. | |
| 7,552,689 B2 | 6/2009 | Schaffert | |
| D596,203 S * | 7/2009 | Schaffert | A01C 5/068 D15/28 |
| 7,581,503 B2 | 9/2009 | Martin | |
| 7,707,952 B2 | 5/2010 | Schaffert | |
| 7,730,962 B1 * | 6/2010 | Kester | A01C 5/06 172/558 |
| 7,975,629 B1 | 7/2011 | Martin | |
| 8,047,301 B2 | 11/2011 | Friggstad et al. | |
| 8,356,563 B2 | 1/2013 | Schaffert et al. | |
| 8,960,322 B2 * | 2/2015 | Kester | A01C 5/062 172/558 |
| 9,113,587 B2 * | 8/2015 | Hesla | A01B 23/06 |
| 9,204,590 B2 | 12/2015 | Schaffert et al. | |
| 9,204,591 B2 * | 12/2015 | Hesla | A01B 15/16 |
| 9,232,689 B2 | 1/2016 | Trevino et al. | |
| 9,326,438 B2 | 5/2016 | Schaffert et al. | |
| 9,346,438 B1 * | 5/2016 | Parker, III | B08B 1/002 |
| 9,769,971 B2 * | 9/2017 | Hesla | A01C 7/203 |
| 9,872,423 B2 * | 1/2018 | Anderson | A01C 5/068 |
| 10,196,048 B2 * | 2/2019 | Yoon | B60B 33/045 |
| 10,448,563 B2 * | 10/2019 | Schaffert | A01B 23/06 |
| D908,742 S * | 1/2021 | Ankenman | D15/28 |
| 11,071,242 B2 * | 7/2021 | McLuckie | A01B 15/16 |
| 11,089,722 B2 * | 8/2021 | McLuckie | A01C 5/064 |
| 11,252,852 B2 * | 2/2022 | Hesla | A01C 7/203 |
| 11,477,937 B2 * | 10/2022 | Hodel | A01C 5/068 |
| 2002/0078869 A1 | 6/2002 | Brummelhuis | |
| 2003/0051650 A1 | 3/2003 | Engelke et al. | |
| 2005/0072344 A1 | 4/2005 | Kester | |
| 2005/0155536 A1 | 7/2005 | Wendte et al. | |
| 2007/0113763 A1 | 5/2007 | Schaffert | |
| 2007/0278272 A1 | 12/2007 | Fast | |
| 2008/0011208 A1 | 1/2008 | Martin | |
| 2008/0066662 A1 * | 3/2008 | Hesla | A01C 5/064 111/164 |
| 2008/0257237 A1 | 10/2008 | Friesen et al. | |
| 2008/0303238 A1 | 12/2008 | Fichter | |
| 2009/0000796 A1 | 1/2009 | Cooper et al. | |
| 2009/0056962 A1 | 3/2009 | Martin et al. | |
| 2009/0084295 A1 | 4/2009 | Schaffert | |

(56) References Cited

U.S. PATENT DOCUMENTS

| | | | |
|---|---|---|---|
| 2009/0235853 | A1 | 9/2009 | Schaffert |
| 2012/0192774 | A1* | 8/2012 | Hesla ................... A01B 15/16 |
| | | | 111/163 |
| 2013/0074747 | A1 | 3/2013 | Schaffert et al. |
| 2014/0014377 | A1* | 1/2014 | Hesla ................... A01C 5/068 |
| | | | 172/558 |
| 2016/0113187 | A1* | 4/2016 | Hesla ................... A01B 23/06 |
| | | | 172/566 |
| 2018/0368306 | A1* | 12/2018 | Hesla ................... A01B 15/16 |
| 2022/0371555 | A1* | 11/2022 | Schaffert ............... A01C 5/068 |

OTHER PUBLICATIONS

Author Unknown, "3000 Series Kinze Planters", 2003, 3-6 and 12.
Author Unknown, "8000 Series Planters: Simply Advanced", White Planters, 2001, 13-15.
Author Unknown, "Brochure: The Precision Vacuum Planter, NG Plus Series", A.T.I., Inc., Monosem, Lenexa, Kansas, at least as early as Dec. 21, 2007, Dec. 21, 2007, 10 pages.
Author Unknown, "Changing Planting Depth", at least as early as Dec. 21, 2007, Dec. 21, 2007, 3 pages.
Author Unknown, "Cost-Effective Solutions for Real-World Needs", Yetter Profitable Solutions, at least as early as Dec. 21, 2007, Dec. 21, 2007, 1-29.
Author Unknown, "Dawn 1572/1500 Coulter Combo", Jul. 28, 2004, Jul. 28, 2004, 2 pages.
Author Unknown, "Dawn Curvtine™ Closing Wheel", 1997, 2 pages.
Author Unknown, "Dawn Trashwheels Row Cleaner", at least as early as Dec. 21, 2007, Dec. 21, 2007, 1 page.
Author Unknown, "Ferti-Placer", Schaffert Manufacturing Co., Inc., at least as early as Dec. 21, 2007, Dec. 21, 2007, 2 pages.
Author Unknown, "Groff AG Improvements, LLC", at least as early as Dec. 21, 2007, Dec. 21, 2007, 4 pages.
Author Unknown, "Hawkins Manufacturing Inc.", at least as early as 2002, 2002, 1 page.
Author Unknown, "Heavy-Duty Coulter", at least as early as Dec. 21, 2007, Dec. 21, 2007, 3 pages.
Author Unknown, "http://precision_planting.com/html/keeton. html", at least as early as Dec. 30, 2000, Dec. 30, 2000, 1 page.
Author Unknown, "Keeton Seed Firmer", J & K Enterprises, 1994, 2 pages.
Author Unknown, "Keeton Seed Firmer, Precision Planting", at least as early as Apr. 9, 2001, Apr. 9, 2001, 4 pages.
Author Unknown, "Photos Labeled "Photo A" and "Photo B"", Oct. 17, 2007, Oct. 17, 2007, 1 page.
Author Unknown, "Planter "N" Forcer, Planter Fertilizer Attachments online product information description", Hawkins Mfg. Inc. Retrieved from http://www.hawkinsmfg.com/ attachments.htm on Dec. 9, 2012, Dec. 9, 2012, 2 pages.
Author Unknown, "Planter Fertilizer Attachments", Hawkins Manufacturing Inc., at least as early as Dec. 21, 2007, Dec. 21, 2007, 4 pages.
Author Unknown, "Seed to Soil Inforcer", Seed Flap, Spring 1995, 1995, 1 page.
Author Unknown, "Sunco: Effectively Moves Trash in All Conditions!", at least as early as Dec. 21, 2007, Dec. 21, 2007, 2 pages.
Author Unknown, "Sunco: Your Solution for Accurate Starter Fertilizer Placement", at least as early as Dec. 21, 2007, Dec. 21, 2007, 2 pages.
Author Unknown, "Tine-Tooth Row Tillage Attachment", at least as early as Dec. 21, 2007, Dec. 21, 2007, 9 pages.
Author Unknown, "Tube Alignment Brackets", M & J Cotton Farms, Inc., at least as early as Oct. 30, 1995, Oct. 30, 1995, 1 page.
Author Unknown, "We Know It's All About Strong Roots", Yetter Profitable Solutions, at least as early as Dec. 21, 2007, Dec. 21, 2007, 1-29.
Author Unknown, "Yield-Pro Planters: Unsurpassed in form, function and safety", Great Plains, at least as early as Dec. 21, 2007, Dec. 21, 2007, 4, 5 and 10.
Author Unknown, "Yield-Pro Planters: Yield increasing row spacing options coupled with best in class productivity and accuracy", at least as early as Dec. 21, 2007, Dec. 21, 2007, 1 page.
Finck, "Where to start with starter fertilizer", Farm Journal, Jan. 1996, Jan. 1996, 15-16.

* cited by examiner

WHEEL SCRAPER FOR AGRICULTURAL PLANTER

FIELD

The described embodiments relate generally to agricultural seed planters and, in particular, to wheel scrapers.

BACKGROUND

Agricultural seed planting is typically accomplished by multi-row planters. Each planter may include multiple row units adapted for opening a seed furrow, depositing seeds within the furrow, and closing the seed furrow around the seeds. Wheels of the planter may accumulate soil during operation, particularly so in wet or moist conditions of the soil. Conventional solutions to soil accumulation include metal plates mounted in a fixed position adjacent to the wheels with a narrow clearance. The fixed metal plate can hinder the operation of the planter wheel as mud cakes on the plate and packs into the narrow clearance, ultimately causing friction that may cause the wheel to stop turning. In some cases, an operator of the planter is required in conventional systems to stop the tractor in order to clean the scrapers when the narrow clearance becomes clogged. As such, there is a need for systems and techniques to facilitate to mitigate soil accumulation on wheels used with a planter.

The information included in this Background section of the specification, including any references cited herein and any description or discussion thereof, is included for technical reference purposes only and is not to be regarded subject matter by which the scope of the invention as defined in the claims is to be bound.

SUMMARY

In one example, a wheel scraper for an agricultural planter is disclosed. The wheel scraper includes a body defining a mounting portion. The body further defines a biasing portion extending from the mounting portion. The body further defines a tine portion extending from the biasing portion opposite the mounting portion. The mounting portion is configured to couple the wheel scraper to an agricultural planter relative to a wheel on the agricultural planter such that the tine portion is arranged extending adjacent to an outer circumferential surface of the wheel and separated from the outer circumferential surface by a clearance. The biasing portion is configured to resiliently bias the tine portion relative to the outer circumferential surface.

In another embodiment, the body may be formed from an elastically deformable metal material. The elastically deformable metal material may include a one-piece structure that defines each of the mounting portion, the biasing portion, and the tine portion. In some cases, the biasing portion includes a coiled section of the elastically deformable material.

In another example, the biasing portion may be configured to induce a vibration of the tine portion in response to accumulated soil extending radially from the wheel beyond the clearance and impacting the tine portion. The tine portion may have an elongated shape that matches a width-wise contour of the outer circumferential surface. In some cases, the tine portion is elongated and defines an ellipsoid cross section along a length of the tine portion.

In another example, the wheel includes a first hub side and a second hub side with the outer circumferential surface positioned therebetween. The mounting portion may be configured to couple the wheel scraper to the agricultural planter relative to the wheel such that the tine portion is arranged extending from the first hub side, across an entire width-wise dimension of the outer circumferential surface at the clearance, and past the second hub side. In this regard, the mounting portion may be configured to couple the wheel scraper to the agricultural planter relative to the wheel such that the tine portion is arranged off-axis relative to an axis of rotation of the wheel.

In another example, a wheel scraper assembly is disclosed. The wheel assembly includes any of the wheel scrapers described herein. The wheel assembly further includes a mounting plate coupled with the mounting portion. The mounting plate is configured to couple the wheel scraper to the agricultural planter.

In another example, the mounting plate may be configured to couple to a fork of a wheel on the agricultural planter. For example, the mounting plate may include a plate body having a first end and a second end opposite the first end. The plate body may define a first attachment feature and a second attachment feature at the first end and a tine attachment feature at the second end. The first attachment feature may be configured to positionally fix the mounting plate relative to an axis of the wheel. The second attachment feature, in cooperation with the first attachment feature, may be configured to rotationally fix the mounting plate relative to the axis. The tine attachment feature may be configured to positionally fix the mounting portion of the wheel scraper relative to the wheel. In some cases, the first attachment feature includes a first hole configured to receive an axle component of the wheel. Further, the second attachment feature includes a second hole configured to receive a fastener for attachment to a fork segment of a fork of the wheel.

In another example, a wheel assembly is disclosed. The wheel assembly includes a wheel of an agricultural planter. The wheel includes an outer circumferential surface configured to contact and rotate along a ground surface. The wheel assembly may further include a wheel scraper coupled to the agricultural planter. The wheel scraper includes a first portion positionally fixed relative to the wheel. The wheel scraper further includes a second portion, opposite the first portion, and extending elongated along the outer circumferential surface of the wheel and resiliently biased relative to the first portion. The second portion is separated from the outer circumferential surface by a clearance.

In another example, the second portion defines a free end of the wheel scrapper. In some cases, the second portion is configured to flex in response to a soil filling the clearance. For example, the flex of the second portion may be configured to lift the soil from the clearance and scrape the outer circumferential surface.

In another example, the second portion matches a width-wise contour of the outer circumferential surface and maintains the clearance.

In another example, a method of removing accumulated soil from a wheel of an agricultural planter is disclosed. The method includes blocking soil from passage through a clearance. The clearance is defined between a wheel scraper and an outer circumferential surface of the wheel. The wheel scraper includes a first portion positionally fixed relative to the wheel. The wheel scraper further includes a second portion, opposite the first portion, and extending elongated along the outer circumferential surface of the wheel and resilient biased relative to the first portion. The method further includes scraping the soil from the wheel by inducing a vibration of the second portion that prevents build-up of the soil within the clearance.

In another example, the second portion may define a circular cross section along its length and the method further comprising inhibiting caking of the soil on the second portion by engaging the soil on the wheel with a round profile of the second portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to a scraper for a wheel, such as a wheel for an agricultural planter. The wheel scraper may be a resilient or flexible component that is configured to cast off and remove mud, soil, and the like from a wheel. Example wheels include press wheels of an agricultural planter, which may include hard rubber tires, pneumatic tires, and/or other constructions. Wheels may also include substantially any other wheel used with an agricultural planter including, gauge wheels, closing wheels, track-type wheels, and other wheels, including those of various different widths and diameters. Accordingly, while a scraper for a press wheel is described in detail below, it will be appreciated that the scraper may be used with a variety of other wheels, as contemplated by the present disclosure.

Press wheels, as with many other wheels, may accumulate soil during rotation over soil. Particularly when soil has an elevated moisture content, the soil may cake on to the press wheel and/or any associated fixed-plate scraper and hinder an operation of the wheel. For example, the soil may form a mud that adheres to an outer circumferential surface of the wheel when the outer circumferential surface contacts the mud. The rotation of the outer circumferential surface may carry and collect the adhered mud as the wheel rotates. Each subsequent rotation of the wheel may further cause additional mud to accumulate on the outer circumferential surface and in some cases over previous layers of mud. As the mud or soil or other debris accumulate on the wheel, the wheel may be more difficult to rotate, or prevented from rotating, or otherwise contribute to an inefficient operation of the wheel and the associated planter, such as where the accumulated mud changes a height of the wheel relative to other components of the planter. Fixed metal plates may be used to scrape the accumulated soil from wheel during rotation in conventional systems. However, such plates may direct mud through a narrow clearance that ultimately promotes caking and contributes to excess friction that may cause the wheel to stop turning.

The wheel scraper of the present disclosure may mitigate such hindrances, in part, by being configured to scrape mud from a wheel using a tine portion or other elongated, generally cylindrical feature. The tine portion may extend across a back edge region of a wheel and define a clearance with the wheel. One end of the tine portion may be generally positionally fixed relative to the wheel. The other opposing end of the tine portion may define a free end of the scraper. The free end may be free to vibrate or move relative to the positionally fixed end of the tine portion. In this way, the wheel scraper may scrape mud or other accumulations introduced to the clearance. As the tine portion resists, the tine portion may flex or otherwise move the free end. This may induce a vibration (along with the bouncing of entire wheel and associated planter) that prevents caking of mud on the tine portion and tire and also promotes sloughing off the mud. The elongated, cylindrical shape, such as that with an ellipsoid cross-section, may also help prevent caking by reducing a total surface area available for med caking, as compared with conventional designs.

In one example, the wheel scraper includes a body that defines the tine portion. The body may also define a mounting portion, a biasing portion extending from the mounting portion. The tine portion may extend from the biasing portion opposite the mounting portion. The mounting portion may generally be configured to couple the wheel scraper to an agricultural planter in order to position the tine portion relative to the wheel, such as a press wheel. For example, the mounting portion may couple the wheel scraper to the planter such that tine portion is arranged extending adjacent to an outer circumferential surface of the wheel and separated from the outer circumferential surface by a clearance. In some cases, the clearance may be minimal or negligible, such as where the tine portion generally rests on or is pressed slightly against the outer circumferential surface of the wheel. The tine portion and the outer circumferential surface may define the clearance to have a dimension that is configured to allow the tine portion to scrape the outer circumferential surface of the wheel without promoting mud caking on the scraper; sample dimensions of the clearance include at least ¾ inch, at least ½ inch, at least ¼ inch or smaller. In some cases, the clearance may be substantially zero inches, for example, where the tine is configured to contact, engage and/or otherwise rest on the wheel. In other cases, the clearance could be larger than ¾ inch, as may be appropriate for a given application. The tine portion may be defined by an elongated shape that generally matches a width-wise contour of the wheel, including an elongated shape that is curved to match a curvature of the wheel. In this regard, the tine portion may be shaped to define a generally consistent clearance dimension along the wheel.

The biasing portion may be configured to resiliently bias the tine portion relative to outer circumferential surface. For example, the body may be formed from a single, continuous piece of metal material. The biasing portion may be a coiled section of the metal material. The coiled section may define a spring with a relatively stiff spring constant. For example, the single piece of metal material may include substantially cylindrical tine having a diameter of around ⅛ inch to ⅜ inch, for example, such as preferably having a diameter of around ¼ inch. The metal material may be coiled to define one, two, three or more complete coils to form the biasing portion. The tine portion may be coupled to the biasing portion such that the biasing portion allows the tine portion to flex in response to a force along the elongated length of the tine portion, such as a force directed toward the tine portion from mud on the outer circumferential surface of the wheel. The biasing portion also limits the flex of tine portion due to the stiff spring. As the tine portion flexes and resists the impact of mud, the tine portion may move back, resiliently, to an undeformed or initial position. In some cases, this may induce a vibration along the tine portion that help prevent caking. The vibration may also operate to remove mud from the wheel and the wheel scraper.

The mounting portion may be configured to couple the wheel scraper to the agriculture planter. For example, the mounting portion may be configured to positionally fix a portion of the wheel scraper relative to the agriculture planter such that the tine portion and associated free end may flex and vibrate relative to the positionally fixed portion. In one example, the mounting portion may be defined by a loop, hook, or other shape of an end of the body that is configured to receive a fastening structure, such as screws, bolts, and the like. The mounting portion may receive the fastening structure to fix the wheel scraper to bracket, plate, rod, fork, or other component associated with the wheel.

In one example, the wheel scraper and fastening structure may be components of a wheel scraper assembly. The wheel assembly may further include a mounting plate. The mounting plate be coupled with the wheel scraper at the mounting portion via the fastening structure. The mounting plate may be configured to couple the wheel scraper to the agriculture planter. For example, the wheel of the agricultural planter may be set in a fork having fork segments in which in axle component of the wheel is arranged. The mounting plate may be coupled to a fork segment at the axle component in order to arrange the wheel scraper relative the wheel. The mounting plate may be positionally and rotationally fixed at the fork segment such that the wheel scraper remains secure and appropriately arranged relative to the wheel while still allowing the tine portion to flex, via the biasing portion.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1:
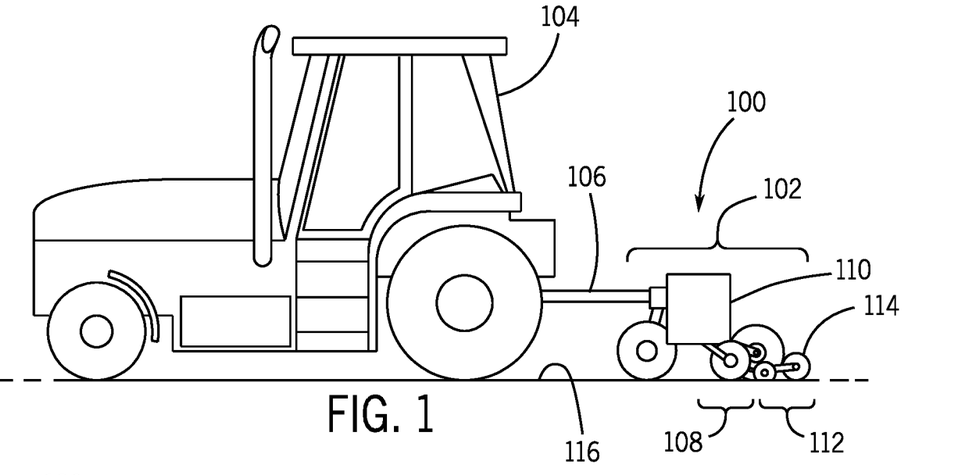
FIG. 1 depicts a system including an agricultural tractor pulling an agricultural planter.

For purposes of illustration, FIG. 1 presents an exemplary embodiment of an agriculture planter 100. The agriculture planter 100 is shown in order to depict an example implementation of any of wheel scrapers described herein. It will be appreciated that other planters, tractors, machinery, and vehicles more generally may implement any of the wheel scrapers described herein. The example, agriculture planter 100 includes one or more trailing arm assemblies 102 attached to an agricultural tractor 104. The agricultural tractor 104 may have a hitch receiver 106 extending rearward therefrom. The tractor 104 tows the planter 100 and provides power to the planter 100 (e.g., via a power take off ("PTO"), not shown) for powering the operations of the planter 100. Additional operations of the planter 100 may be powered by hydraulics or electrical motors (not shown) powered by the tractor 104.

Components of the planter 100 may include a plurality of trailing arm assemblies 102 attached to the tractor 104 via a bar, hitch, or yoke 106. The trailing arm assemblies 102 may function as row units which include an opener assembly 108 for creating a furrow, a planter unit 110 for planting seeds and distributing liquid fertilizer, and a closing assembly 112 for pushing soil over the seeds and closing the furrows. In some cases, the trailing furrow closer assembly 112 may include a press wheel, closing wheel or any other type of wheel that is capable of accumulating mud during operation of planter. For example, as shown in FIG. 1, the trailing furrow closer assembly 112 may include a wheel 114. The wheel 114 may rotate relative to a ground surface 116. The ground surface 116 may include soil, such as a soil with a high moisture content. The ground surface 116 may therefore include mud that is subject to accumulation on the wheel 114. The wheel scraper of the present disclosure may be associated with the wheel 114 and operate to remove mud or other accumulated soil from the wheel 114 without caking.

Figure 2:
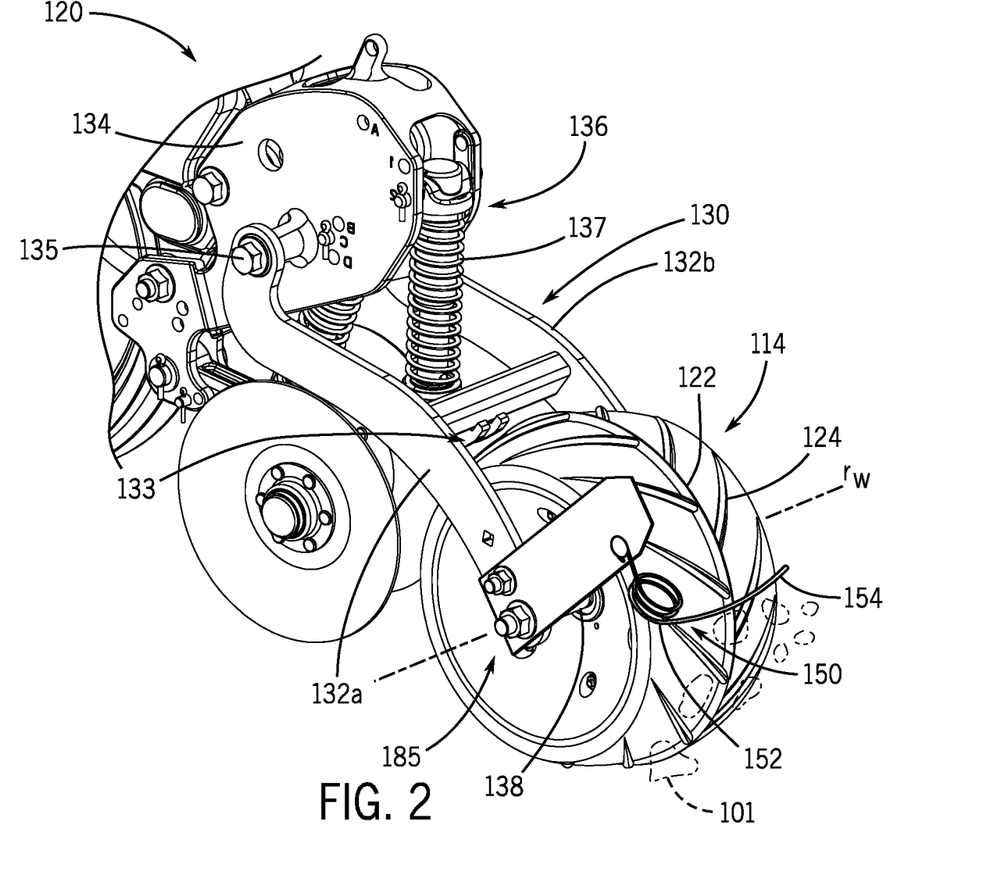
FIG. 2 depicts the agricultural planter of FIG. 1 including a press wheel assembly and tine scraper.

For example, and with reference to FIG. 2, a wheel assembly 120 of the furrow closing assembly 112 is shown including the wheel 114 and a wheel scraper 150, such as any of the wheel scrapers discussion above and now described in more detail below. The wheel scraper 150 may be configured to scrape soil, mud debris and/or other accumulations from the wheel 114. The wheel 114 may be a hard rubber tire, pneumatic tire, or other tires or wheels of various other constructions, including tires that have different dimensions than the wheel 114 shown in FIG. 2. The wheel 114 is shown as including an outer circumferential surface 122. The outer circumferential surface 122 may be a surface of the wheel that is configured to contact a ground surface during operation of the planter 100, for example, such as a ground surface that includes soil or mud. The outer circumferential surface 122 is shown as including treads 124 in FIG. 2. The treads 124 may provide traction to the wheel 114 by digging into the soil. This operation of the treads 124 may contribute to soil accumulation on the wheel 114 as the treads 124 disturb the soil and lift the soil from the ground. While FIG. 2 shows the treads 124 as features of the outer circumferential surface 122, in other cases, the wheel 114 may include tracks, protrusions, and/or various other features that provide traction to the wheel 114 and/or contribution to soil accumulation. In other embodiments, the wheel 114 may have a smooth outer circumferential surface 122.

The wheel 114 may be arranged within the planter 100 via the wheel assembly 120, as shown in FIG. 2. The wheel assembly 120 may include, among other components, a fork 130 having a first fork segment 132a and a second fork segment 132b, and a suspension assembly 136. The fork 130 may be configured to secure the wheel 114 to a frame component 134 of the closing assembly 112 and allow the wheel 114 to rotate about an axis of rotation $r_w$. For example, the fork 130 includes the first fork segment 132a and the second fork segment 132b. The first and second fork segments 132a, 132b cooperate to define a wheel slot 133 that is configured to accommodate the wheel 114. For example, the wheel slot 133 may be slightly wider than a width of the wheel 114, thereby allowing the wheel 114 to rotate within the wheel slot 133. The first and second fork segments 132a, 132b may further be configured to couple with an axle component 138 and terminal ends of the first and second fork segment 132a, 132b. As shown in the example of FIG. 2, the axle component 138 may be received by the first and second fork segments 132a, 132b and the wheel 114 along the axis of rotation $r_w$. The axle component 138 may be secured to the first and second fork segments 132a, 132b in a manner that allows the wheel 114 to rotate about the axis of rotation $r_w$ while remaining secured to the planter 100, via the fork 130.

The fork 130, as shown in FIG. 2, may be coupled to the frame component 134 and the suspension assembly 136. The frame component 134 may generally be configured to attach the wheel 114, fork 130, the suspension assembly 136, and associated components and subassemblies to the planter 100. For example, the frame component 134 may be configured to attach the fork 130 to the end of the trialing furrow closing assembly 112, as one example. In some cases, the fork 130 may be attached to the frame component 134 by a pivot feature 135 configured to allow the fork 130 to pivot relative to other components of the planter 100. In this regard, the fork 130 and associated wheel 114, may move, bounce, or otherwise flex as the planter 100 operates. The suspension assembly 136 may be coupled to the frame component 134 and the fork 130 and operate to dampen movement of the fork 130 relative to the attachment mechanism 134 and planter 100. As one example, and as shown in FIG. 2, the suspension assembly 136 may include a stiff spring 137 may be attached to both the fork 130 and the frame component 134 and/or other section of the planter 100 at which the fork 130 pivots relative thereto. In this manner, the stiff spring 137 may provide resistance to the pivoting of the fork 130. It will be appreciated that in other cases, other components and arrangements of the wheel assembly 120 are contemplated herein, including assemblies which the wheel 114 is a wheel of other a different planter, a wheel having a different function or configuration in the planter 100, a wheel of tractor, other machinery, and so on. In this regard, while the wheel assembly 120 is shown as one example implementation of the wheel scraper 150, in other cases, the wheel scraper 150 may be used with various other wheels and wheel assemblies.

Figure 6:
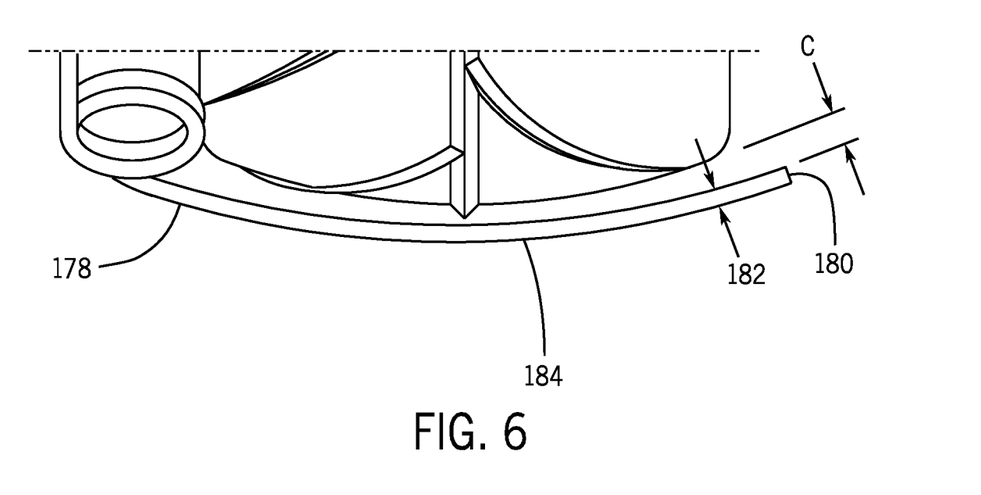
FIG. 6 depicts a right side perspective view of the mounted tine scraper and press wheel assembly of FIG. 4.

The wheel scraper 150 is arranged in the wheel assembly 120, as shown in FIG. 2 in order to scrape soil, mud, debris, and the like from the outer circumferential surface 122 of the wheel 114. Broadly, the wheel scraper 150 includes a first portion 152 and a second portion 154. The first portion 152 may be positionally fixed relative to the wheel 114. The second portion 154 may extend elongated from the first portion 152 along the outer circumferential surface 122. The second portion 154 may be resiliently biased relative to the first portion 152. The first portion 152 may be positionally fixed relative to the wheel 114 such that the second portion 154 extends along the outer circumferential surface 122 at a predefined separation or clearance C (FIG. 6). During rotation of the wheel 114, soil 101 may attach to the outer circumferential surface 122. The rotation of the outer circumferential surface 122 may advance the soil toward the second portion 154. The soil 101 may extend radially beyond the clearance and impact the second portion 154. The second portion 154 may prevent the soil 101 from advancing, e.g., moving through the clearance C, and cause the soil 101 to be expelled from the wheel 114. In some cases, the resilient bias of the second portion 154 may induce a vibration upon the impact of the soil 101 that promotes the expulsion of the soil 101 and generally prevents caking of the soil 101 on the wheel scraper 150.

Figure 3:
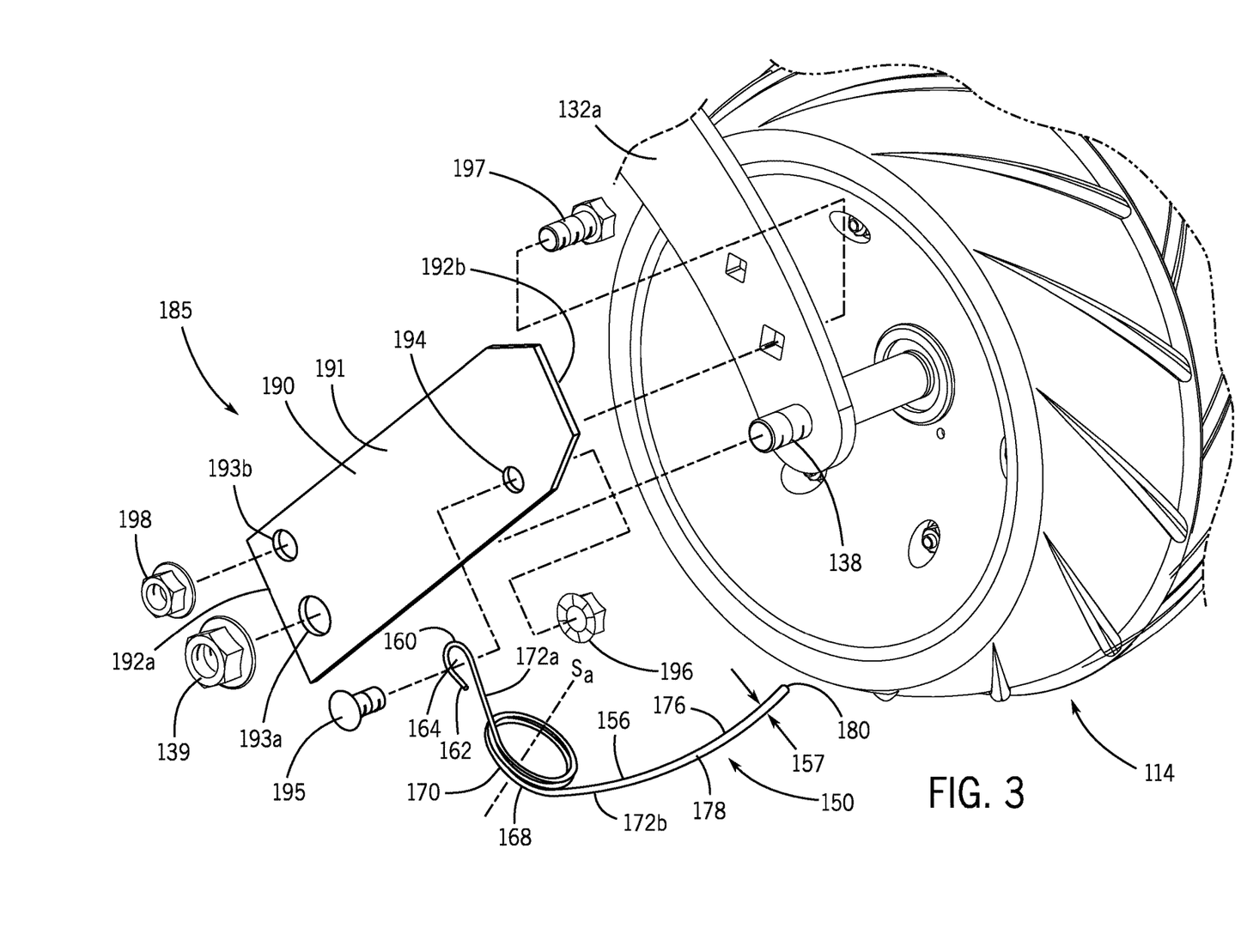
FIG. 3 depicts an exploded view of the including the press wheel assembly and tine scraper of FIG. 2.

To facilitate the foregoing, and with reference to the exploded view of FIG. 3, the wheel scraper 150 includes a body 156 that defines a mounting portion 160, a biasing portion 168, and a tine portion 176. The body 156 may be formed from a metal material, including certain steel materials, aluminum materials, and/or alloys. The metal material of the body 156 may have some elasticity. For example, the body 156 may be formed from an elastically deformable material that allow for some degree of flex or bending of the material without fracture or breaking. The material may also have high fatigue resistance that allows the body 156 to be deformed cyclically without inducing premature flexural failure of the material. The body 156 may define the mounting portion 160, the biasing portion 168, and the tine portion 176 as a continuous one-piece or monocoque structure. For example, the body 156 may be an elongated tine or wire that is manipulated to define the wheel scraper 150 and various portions. While various arrangements are contemplated, the body 156 may have a generally ellipsoid cross section having a diameter 157 of approximately between around ⅛ inch to ⅜ inch, for example, such as preferably having a diameter of around ¼ inch. The diameter 157 may extend across an entire length of the wheel scraper 150.

The mounting portion 160 may be configured to couple the wheel scraper 150 to the planter 100. In this regard, the mounting portion 160 may be or form a component of the first portion 152 of the wheel scraper 150, as described above. As shown in FIG. 3, the mounting portion 160 may include an attachment structure 162 defined by the body 156. The attachment structure 162 may be a loop, hook, and/or other feature that is configured to facilitate the coupling of the wheel scraper 150 with a fastener or other structure. In this regard, the attachment structure 162 may include a through portion 164. The through portion 164 may be an opening defined by the loop or attachment structure 162 that is configured to receive a shaft of a screw or bolt. The through portion 164 may be sufficiently small such that a head of the screw or bolt cannot pass through. The attachment structure 162 may define the through portion 164 with at least on complete circumferential pass of the material of the body 156 (i.e., a loop) in order to constrain the attachment structure 162 from disengagement with a fastening device.

The biasing portion 168 may extend from the mounting portion 160 and operate to provide a resilient bias to the wheel scraper 150. As shown in FIG. 3, the biasing portion 168 may include a coiled section 170 of the body 156. For example, the body 156 including the deformable metal material may be wound in one, two, three, four or more coils between a first spring end 172a and a second spring end 172b. The first spring end 172a may be connected to and extend from the continuous metal material that defines the mounting portion 160. The second spring end 172b may be connected to and extend from the continuous metal material that defines the tine portion 176. The coiled section 170 may permit the body 156 to function as a torsion spring between the first and second spring ends 172a, 172b. For example, the coiled section 170 may permit the first and second spring ends 172a, 172b to rotate relative to one another about a spring axis $S_a$. As the first and second spring ends 172a, 172b rotate relative to one another about the sprig axis $S_a$, the coiled section 170 provides increasing resistance to the rotation as a function of the spring constant defined by the coiled section 170.

The tine portion 176 may extend from the biasing portion 168 opposite the mounting portion 160. For example, the tine portion 176 may extend from the second spring end 172b, as described above, and be resiliently biased relative to the mounting portion 160. In this regard, the tine portion 176 may be or form a component of the second portion 154 of the wheel scraper 150, as described above. As shown in FIG. 3, the tine portion 176 may by defined an elongated shape 178. The elongated shape 178 may have a length of substantially between around 2 inches to 10 inches, and/or other length that is sufficient to extend across an entire width-wise dimension of the wheel 114. In this regard, the tine portion 176 may be a relatively slender or narrow shape that has a substantially longer length as compare to a width of the tine portion 176. The tine portion 176 may have the elongated shape 178 that extends from the biasing portion 168 and to a free end 180. The free end 180 may be generally free to move, vibrate or flex relative to wheel 114 and planter 100. For example, the free end 180 may be a terminal end of the body 156 that is not attached to other components of the scraper 150 of wheel 114. The unconstrained free end 180 imparts flexibility to the tine portion 176 that allows the tine portion 176 to cast off soil or mud to mitigate caking on the wheel scraper 150. In this regard, the free end 180 may promote the sloughing off of root hairs, mud, and/or other elements. In conventional systems that are fixed at opposing end, root hairs and mud may build up and hinder the operation of the wheel, such as in some cases, causing the wheel of conventional systems to stop turning. The free end 180 of the present disclosure may mitigate these hindrances by promoting movement and vibration of the tine portion 176 that operates to physically dislodge the mud, root hairs, and other elements from the tine portion, in part, because the free end 180 is unconstrained.

The elongated shape 178 may also promote the casting off of soil and mud from the tine portion 176. With reference to FIGS. 3 and 6, the tine portion 176 may include an ellipsoid cross-section 182. The ellipsoid cross-section 182 may be defined by the elongated shape 178 along substantially all of the length of the tine portion 176. The ellipsoid cross-section 182 may define curved outer surfaces of the tine portion 176 that are configured to reduce accumulation of soil and mud on the tine portion 176, in part, by reducing or eliminating planar surfaces on which soil can stick. While the ellipsoid cross-section 182 is shown for purposes of illustration, in other cases, the tine portion 176 may have a different cross-section, such as round, oval, square, rectangular, triangular, and/or other shaped cross-section, as appropriate for a given application. The curved outer surfaces may also have a generally reduced total surface area as compared with conventional plate-type scrapers, further reducing the potential for soil accumulation. The elongated shape 178 may define a tine contour 184 along the length of the tine portion 176. The tine contour 184 may define a slight bend in the elongated shape 178 as the tine portion 176 extends from the biasing portion 168. In some cases, the tine contour 184 may define a slight bend in the tine portion 176 such that the elongated shape 178 matches or conforms to a width-wise contour of the wheel 114. In this manner, the elongated shape 178 may define a generally consistent clearance or distance from the outer circumferential surface 122 along the entire width-wise dimension of the wheel 114 to promote consistent scraping.

In some cases, the wheel scraper 150 may be a component or assembly of a wheel scraper assembly 185, as shown in FIG. 3. The wheel scraper assembly 185 may include the wheel scraper 150 and a mounting plate 190. The mounting plate 190 may be configured to couple the wheel scraper 150 to the planter 100. The mounting plate 190 may include a plate body 191 having a first end 192a and a second end 192b opposite the first end 192a. The plate body 191 may define a first attachment feature 193a and a second attachment feature 193b at the first end 192a. The plate body 191 may further define a tine attachment feature 194 at the second end 192b. As shown in FIG. 3, the first and second attachment features 193a, 193b may include holes or through portions formed through a thickness of the plate body 191. The tine attachment feature 194 may also include a hole a through portion formed through a thickness of the plate body 191.

The wheel scraper assembly 185 may also include various hardware components that facilitate fastening the wheel scraper 150 to the mounting plate 190. In the illustrative example of FIG. 3, a first fastener 195, a first securing piece 196, a second fastener 197, and a second securing piece 198 is shown. The first and second fasteners 195, 197 may be screws, bolts, rods, or other components that are configured to be received by one or more components, such as being received by the mounting plate 190, the wheel scraper 150, and/or one or more components of the planter 100, such as a component of the fork 130. The first and second securing pieces 196, 198 may be nuts, clips, and/or other features that are coupleable with corresponding ones of the first and second fastener 195, 197. In other cases, other fasteners may be used. In yet other cases, the wheel scraper 150 may be affixed to the mounting plate 190 via a weld or other coupling technique that permanently affixes the wheel scraper to the mounting plate 190. In yet other cases, the mounting plate 190 and the wheel scraper 150 may be one, integrally formed structure.

Figure 4:
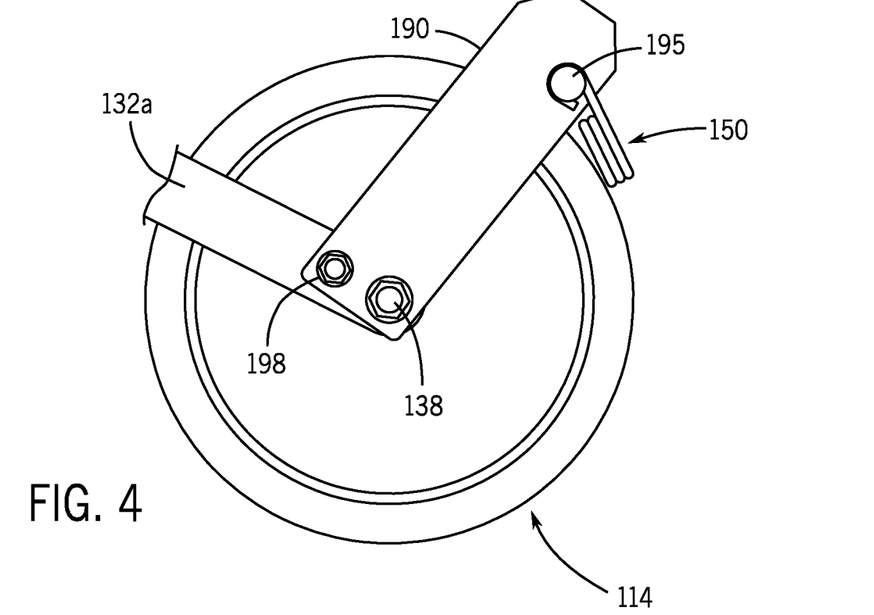
FIG. 4 depicts a left side view of tine scraper of FIG. 3 mounted to the press wheel assembly.
Figure 5:
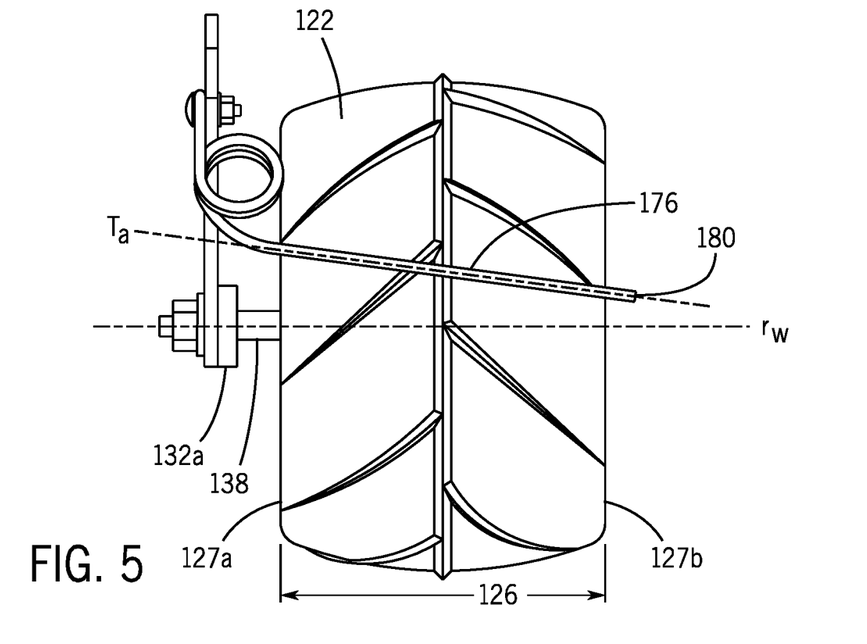
FIG. 5 depicts a rear view of the mounted tine scraper and press wheel assembly of FIG. 4.

With respect to the illustrated example, the wheel scraper 150 may be coupled to the mounting plate 190 in order to arrange the tine portion 176 relative to the outer circumferential surface 122 of the wheel 114. As shown in FIGS. 4 and 5, the mounting portion 160 may be coupled to the tine attachment feature 194. For example, the first fastener 195 may be advanced through the loop or through portion 196 of the mounting portion 160. The first fastener 195 may be further advanced through the hole of the tine attachment feature 194. Upon advancement, the first securing piece 196 may be coupled with the first fastener 195. For example, the first securing piece 196 may be threaded onto the first fastener 195 in order to prevent the mounting plate 190 and the wheel scraper 150 form disengaging from one another.

The coupling of the wheel scraper 150 and the mounting plate 190 may generally positionally fix the first spring section 172 on or relative to the mounting plate 190, as shown in FIG. 4. The coiled section 170 may extend from the first spring section 172a such that the second spring section 172b is arrange extending along a plane that is generally transverse to a plane of the mounting plate 190. For purposes of this disclosure, "transverse" may mean perpendicular, substantially perpendicular, or forming an angle between 55.0 and 125.0 degrees. Accordingly, as the tine portion 176 extends from the second spring section 172b, the tine portion 176 may be arranged extending along a plane that is generally perpendicular to a plane of the mounting plate 190. This orientation of the tine portion 176 may facilitate the arrangement of the tine portion 186 relative to the outer circumferential surface in order to promote scraping.

For example, and as shown in FIGS. 4 and 5, the mounting plate 190 may be coupled with the fork 130 at the first fork segment 132a. For example, the axle component 138 may be advanced at least partially through the first attachment feature 193a, in addition to the wheel 114 and first and second fork segments 132a, 132b, as described above. An axle securing piece 139 may be fastened onto to end of the axle component 138. In this regard, the mounting plate 190 and wheel scraper 150 may be positionally fixed to planter 100 at the axle component 138 of the wheel assembly 120. The mounting plate 190 may also be coupled to the first fork segment 132a at the second attachment feature 193b. For example, the second fastener 197 may be advanced through the opening of the second attachment feature 193b. The second fastener 197 may be further advanced through a hole or other portion of the first fork segment 132a. Upon advancement, the second securing piece 198 may be coupled with the second fastener 197. For example, the second securing piece 198 may be threaded onto the second fastener 197 in order to prevent the mounting plate 190 and the first fork segment 132a from disengaging from one another. The mounting plate 190 may be attached to the first fork segment 132a at both the first and second attachment features 193a, 193b. Accordingly, the second attachment feature 193b, in cooperation with the first attachment feature, may be configured to rotationally fix the mounting plate 190 relative to the wheel axis of rotation $r_w$.

As shown in FIG. 5, the coupling of the mounting plate 190 and the first fork segment 132a may arrange the tine portion 176 along the outer circumferential surface 122. The outer circumferential surface 122 may have a widthwise dimension 126 defined between a first hub side 127a of the wheel 114 and a second hub side 127b of the wheel 114. The tine portion 176 may extend along the outer circumferential surface 122 from the first hub side 127a, across an entire dimension of the widthwise dimension 126 and past the second hub side 127b. In this regard, the free end 180 may be positioned past the second hub side 127b. The tine portion 176 may extend along the outer circumferential surface 122 along a tine axis $T_a$. The tine axis $T_a$ may have a generally downward slope relative to a ground surface of the wheel 114, as shown in FIG. 5. In this regard, the tine axis $T_a$ may be off-axis or otherwise not parallel to the wheel rotational axis $r_w$. The downward slope of the tine axis $T_a$ may permit the tine portion 176 to lift or move or flex upwardly in response to impact from soil. The downward slope may also allow the tine portion 176 to engage soil at different elevations along the outer circumferential surface 122. For example, soil on the outer circumferential surface 122 that is adjacent the first hub side 127a may engage the scraper 150 at an elevationally higher position as compared with soil on the outer circumferential surface 122 that is adjacent to the second hub side 127b. The engagement of the scraper 150 and soil may further vary based on the flex of the tine portion 176, as described herein. This may promote the removal of soil from the wheel 114 by avoid a concentrated buildup of soil in along a fixed a boundary.

As also shown in FIG. 6, the tine portion 176 has the tine contour 184. The tine contour 184 may match the contour of the outer circumferential surface 122. The tine contour 184 may match the contour of the outer circumferential surface 122 along the entire span of the widthwise dimension 126. In this regard, the clearance C or separation between the tine portion 176 and the outer circumferential surface 122 may remain substantially constant.

Figure 7:
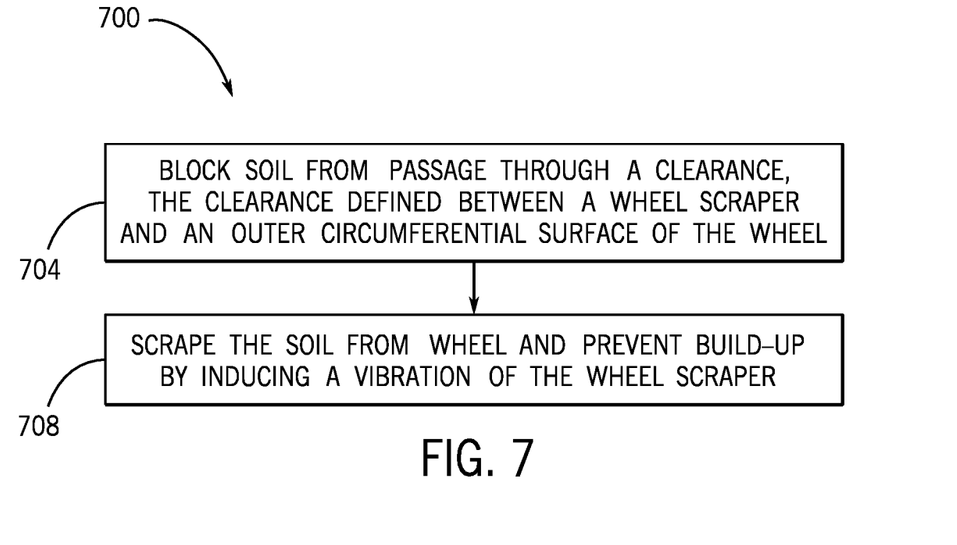
FIG. 7 depicts a flow diagram for removing accumulated soil from a press wheel.

To facilitate the reader's understanding of the various functionalities of the embodiments discussed herein, reference is now made to the flow diagram in FIG. 7, which illustrates process 700. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 704, soil is blocked from passing through a clearance. The clearance is defined between a wheel scraper and an outer circumferential surface of the wheel. For example, and with reference to FIGS. 2 and 6, the soil 101 may be closed from passing through the clearance C. The tine portion 176 of the wheel scraper 150 is arranged relative the outer circumferential surface 122 of the wheel 114 to define the clearance. Soil that extends radially the outer circumferential surface 122 may be unable to progress in light of the presence of the tine portion 176. The tine portion 176 thus scrapes the soil upon impact.

For example, at operation 708, soil is scraped from the wheel and removed from the scraper by inducing a vibration of the wheel scraper that prevent build-up of the soil within the clearance. With reference to FIGS. 2, 5 and 6, the soil 101 that extends radially beyond the clearance C is separated from the wheel 114 by the tine portion 176. As such soil impacts the tine portion 176, the tine portion 176 may flex or bend. For example, the free end 180 may lift up relative to the mounting portion 160. The biasing portion 68 may resist and limit the movement of free end 180 and ultimately cause the free end 180 to return to an undeformed position of the tine portion 176. This movement or resilient deformation of the tine portion 176 may induce a vibration of the wheel scraper 150. The vibration may help remove soil from the scarper in order to prevent caking.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Other examples and implementations are within the scope of the disclosure and appended claims. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A wheel scraper for an agricultural planter comprising:
   a body defining a mounting portion, a biasing portion extending from the mounting portion, and a tine portion extending from the biasing portion opposite the mounting portion;
   wherein the mounting portion is configured to couple the wheel scraper to an agricultural planter relative to a wheel on the agricultural planter such that the tine portion is arranged extending adjacent to an outer circumferential surface of the wheel and separated from the outer circumferential surface by a clearance, and
   wherein the biasing portion is configured to resiliently bias the tine portion relative to the outer circumferential surface.

2. The wheel scraper of claim 1, wherein the body is formed from an elastically deformable metal material.

3. The wheel scraper of claim 2, wherein the elastically deformable metal material comprises a one-piece structure that defines each of the mounting portion, the biasing portion, and the tine portion.

4. The wheel scraper of claim 2, wherein the biasing portion comprises a coiled section of the elastically deformable material.

5. The wheel scraper of claim 1, wherein the biasing portion is configured to induce a vibration of the tine portion in response to accumulated soil extending radially from the wheel beyond the clearance and impacting the tine portion.

6. The wheel scraper of claim 1, wherein the tine portion has an elongated shape that matches a width-wise contour of the outer circumferential surface.

7. The wheel scraper of claim 1, wherein the tine portion is elongated and defines an ellipsoid cross section along a length of the tine portion.

8. The wheel scraper of claim 1, wherein
   the wheel comprises a first hub side and a second hub side with the outer circumferential surface positioned therebetween, and
   the mounting portion is configured to couple the wheel scraper to the agricultural planter relative to the wheel such that the tine portion is arranged extending from the first hub side, across an entire width-wise dimension of the outer circumferential surface at the clearance, and past the second hub side.

9. The wheel scraper of claim 8, wherein the mounting portion is configured to couple the wheel scraper to the agricultural planter relative to the wheel such that the tine portion is arranged off-axis relative to an axis of rotation of the wheel.

10. A wheel scraper assembly comprising:
    the wheel scraper of claim 1, and
    a mounting plate coupled with the mounting portion, wherein the mounting plate is configured to couple the wheel scraper to the agricultural planter.

11. The wheel scraper assembly of claim 10, wherein the mounting plate is configured to couple to a fork of a wheel on the agricultural planter.

12. The wheel scraper assembly of claim 11, wherein
    the mounting plate comprises a plate body having a first end and a second end opposite the first end,
    the plate body defines a first attachment feature and a second attachment feature at the first end and a tine attachment feature at the second end,
    the first attachment feature is configured to positionally fix the mounting plate relative to an axis of the wheel and the second attachment feature, in cooperation with the first attachment feature, is configured to rotationally fix the mounting plate relative to the axis, and
    the tine attachment feature is configured to positionally fix the mounting portion of the wheel scraper relative to the wheel.

13. The wheel scraper assembly of claim 12, wherein
    the first attachment feature comprises a first hole configured to receive an axle component of the wheel, and
    the second attachment feature comprises a second hole configured to receive a fastener for attachment to a fork segment of a fork of the wheel.

14. A wheel assembly of an agricultural planter comprising:
    a wheel having an outer circumferential surface configured to contact and rotate along a ground surface; and
    a wheel scraper coupled to the agricultural planter and comprising:
      a first portion positionally fixed relative to the wheel, and
      a second portion, opposite the first portion, and extending elongated across the outer circumferential surface of the wheel and resiliently biased relative to the first portion,
    wherein the second portion is a tine at a free end of the wheel scraper and is separated from the outer circumferential surface by a clearance.

15. The wheel assembly of claim 14, wherein the second portion defines a free end of the wheel scraper.

16. The wheel assembly of claim 14, wherein the second portion is configured to flex in response to a soil filling the clearance.

17. The wheel assembly of claim 16, wherein the flex of the second portion is configured to lift the soil from the clearance and scrape the outer circumferential surface.

18. The wheel assembly of claim 14, wherein the second portion matches a width-wise contour of the outer circumferential surface and maintains the clearance.

19. A method of removing accumulated soil from a wheel of an agricultural planter, the method comprising:
    blocking soil from passage through a clearance, the clearance defined between a wheel scraper and an outer circumferential surface of the wheel, wherein the wheel scraper includes
      a first portion positionally fixed relative to the wheel, and
      a second portion, opposite the first portion, and extending elongated across the outer circumferential surface of the wheel and resiliently biased relative to the first portion; and
    scraping the soil from the wheel and preventing build-up at the scraper by inducing a vibration of the second portion that prevents build-up of the soil within the clearance.

20. The method of claim 19, wherein the second portion defines a circular cross section along its length and the method further comprising inhibiting caking of the soil on the second portion by engaging the soil on the wheel with a round profile of the second portion.

\* \* \* \* \*